(12) United States Patent
Weinberg et al.

(10) Patent No.: US 7,426,861 B2
(45) Date of Patent: Sep. 23, 2008

(54) TUNING FORK GYROSCOPES, ACCELEROMETERS, AND OTHER SENSORS WITH IMPROVED SCALE FACTOR

(75) Inventors: Marc S. Weinberg, Needham, MA (US); Jonathan Bernstein, Medfield, MA (US); Jeffrey T. Borenstein, Holliston, MA (US); Richard Elliott, Stoneham, MA (US); Gregory Kirkos, Seattle, WA (US); Anthony S. Kourepenis, Acton, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 231 days.

(21) Appl. No.: 11/153,664

(22) Filed: Jun. 15, 2005

(65) Prior Publication Data

US 2006/0283246 A1 Dec. 21, 2006

(51) Int. Cl.
*G01P 9/04* (2006.01)
*G01P 15/125* (2006.01)

(52) U.S. Cl. .................... 73/504.16; 73/514.32
(58) Field of Classification Search ............ 73/504.16, 73/504.12, 504.14, 514.32
See application file for complete search history.

(56) References Cited

U.S. PATENT DOCUMENTS

| 5,481,914 | A |   | 1/1996 | Ward |   |
|---|---|---|---|---|---|
| 5,492,596 | A |   | 2/1996 | Cho |   |
| 5,747,961 | A |   | 5/1998 | Ward et al. |   |
| 5,892,153 | A | * | 4/1999 | Weinberg et al. | ........ 73/504.16 |
| 2003/0066351 | A1 | * | 4/2003 | Weinberg et al. | ........ 73/504.16 |

* cited by examiner

*Primary Examiner*—John E Chapman
(74) *Attorney, Agent, or Firm*—Iandiorio Teska & Coleman

(57) ABSTRACT

A tuning fork gyroscope design where at least one proof mass is supported above a substrate. At least one drive electrode is also supported above the substrate adjacent the proof mass. Typically, the proof mass and the drive electrode include interleaved electrode fingers. A sense plate or shield electrode on the substrate beneath the proof mass extends completely under the extent of the electrode fingers of proof mass.

11 Claims, 5 Drawing Sheets

TUNING FORK GYROSCOPES, ACCELEROMETERS, AND OTHER SENSORS WITH IMPROVED SCALE FACTOR

FIELD OF THE INVENTION

This invention relates to sensors, typically microelectromechanical (MEMS) sensors, such as tuning fork gyroscopes, accelerometers, and other sensors.

BACKGROUND OF THE INVENTION

In microelectromechanical (MEMS) sensors such as tuning fork gyroscopes, accelerometers, and other sensors, a proof mass is supported above a dielectric (e.g., glass) substrate and motion of the proof mass is sensed electronically.

In one MEMS design for a tuning fork gyroscope, two proof masses are suspended above a substrate by support flexures anchored to the substrate. Adjacent the outer sides of each proof mass is a drive electrode structure above the substrate in the same plane as the proof masses and with electrode fingers interleaved with electrode fingers of the proof mass in a comb-like geometry. Between and adjacent the two proof masses and also in the same plane as the proof masses is a pick-off or sense electrode structure also with electrode fingers interleaved with electrode fingers of the proof mass. Beneath each proof mass on the substrate is a sense plate.

The drive electrodes oscillate the proof masses electrostatically in the plane of the device. In response to an inertial input, the proof masses deflect out of the plane of vibration and this deflection is detected by the pick-off electrode. See U.S. Pat. No. 5,747,961 by the assignee hereof hereby incorporated herein by this reference.

Typically, a DC bias voltage is applied to the sense plates on the substrate beneath the proof mass and another DC bias voltage is applied to the drive and pick-off electrode structures adjacent the proof masses to simplify the design of the electronic signal processing circuitry and to maintain precise phase relationships.

Any exposed dielectric substrate beneath the proof masses ultimately assumes a steady state voltage level between the DC bias voltage applied to the sense plates and the DC bias voltage applied to the drive electrodes. Reaching that steady state voltage level, however, can take hours and, until then, while the dielectric substrate voltage level varies between the two DC bias voltage levels, read out errors occur due to scale factor transients as high as 10-15%.

By extending the sense plates on the dielectric substrate and minimizing the amount of exposed dielectric substrate material below the proof masses, the transients were reduced to roughly 1%. Still, for many military and commercial applications, transients as low as 0.01 to 0.1% of final scale factor value are desired.

Possible solutions include commutating the voltage on the pick-off electrode structure, placing AC carrier signals rather than a DC signal on the pick-off electrode structure, placing both AC and DC signals on the sense plate, or controlling the resonant frequency of the drive oscillation to control the drive amplitude.

These potential solutions, however, all suffer from degradation in performance and/or the requirement of costly and complex electronic signal processing circuitry.

SUMMARY OF THE INVENTION

It is therefore an object of this invention to provide a tuning fork gyroscope with an improved scale factor.

It is a further object of this invention to provide such a tuning fork gyroscope which does not suffer from degradation in performance.

It is a further object of this invention to provide such a tuning fork gyroscope which does not require costly and/or complex electronic signal processing circuitry.

It is a further object of this invention to provide an improved MEMS structure useful in connection with sensors including, but not limited to, tuning fork gyroscopes, accelerometers, pressure sensors, and oscillators.

The subject invention results from the realization that by undercutting the drive and/or pick-off electrode structures in a tuning fork gyroscope and extending the sense plate into the undercut region(s), the scale factor transients of the gyroscope can be reduced to less than 1% without degradation in performance or the requirement of costly and/or complex electronic signal processing circuitry because now the sense plate extends completely under the proof mass structure to provide more comprehensive shielding.

The subject invention, however, in other embodiments, need not achieve all these objectives and the claims hereof should not be limited to structures or methods capable of achieving these objectives.

This invention features a tuning fork gyroscope comprising a substrate, at least one proof mass supported above the substrate, and at least one drive electrode supported above the substrate adjacent the proof mass. Typically the proof mass and the drive electrode include interleaved electrode fingers. A sense plate or shield electrode on the substrate beneath the proof mass extends completely under the extent of the electrode fingers of proof mass.

In one example, the drive electrode is supported above the substrate by an anchor portion connected to a shoulder portion from which the electrode fingers of the drive electrode extend. The anchor portion is smaller in area than the shoulder portion defining an undercut region in the drive electrode. The sense plate or shield electrode preferably extends into the undercut region. Typically, the substrate is made of glass and the proof mass and drive electrode are made of silicon. The sense plate or shield electrode is usually made of metal.

In one design, there are two proof masses, a drive electrode on one side of each proof mass, and a sense plate electrode beneath each proof mass. A pick-off electrode structure is located between the two proof masses.

The subject invention, however, is not limited in applicability to gyroscopes. For example, a sensor in accordance with this invention features a substrate, at least one proof mass supported above the substrate, and at least one electrode structure supported above the substrate adjacent the proof mass. The electrode structure includes a smaller area anchor portion extending upward from the substrate connected to a larger area shoulder portion supported above the substrate defining an undercut region in the electrode. A sense plate or shield electrode on the substrate beneath the proof mass typically extends into the undercut region of the electrode. In some designs, proof mass and the drive electrode structure include interleaved electrode fingers. The sense plate or shield electrode then preferably extends completely under the electrode fingers of the proof mass.

BRIEF DESCRIPTION OF THE DRAWINGS

Other objects, features and advantages will occur to those skilled in the art from the following description of a preferred embodiment and the accompanying drawings, in which:

FIG. 5 is a schematic three-dimensional partial view of a portion of a tuning fork gyroscope in accordance with another embodiment of the subject invention; and.

DISCLOSURE OF THE PREFERRED EMBODIMENT

Figure 1:
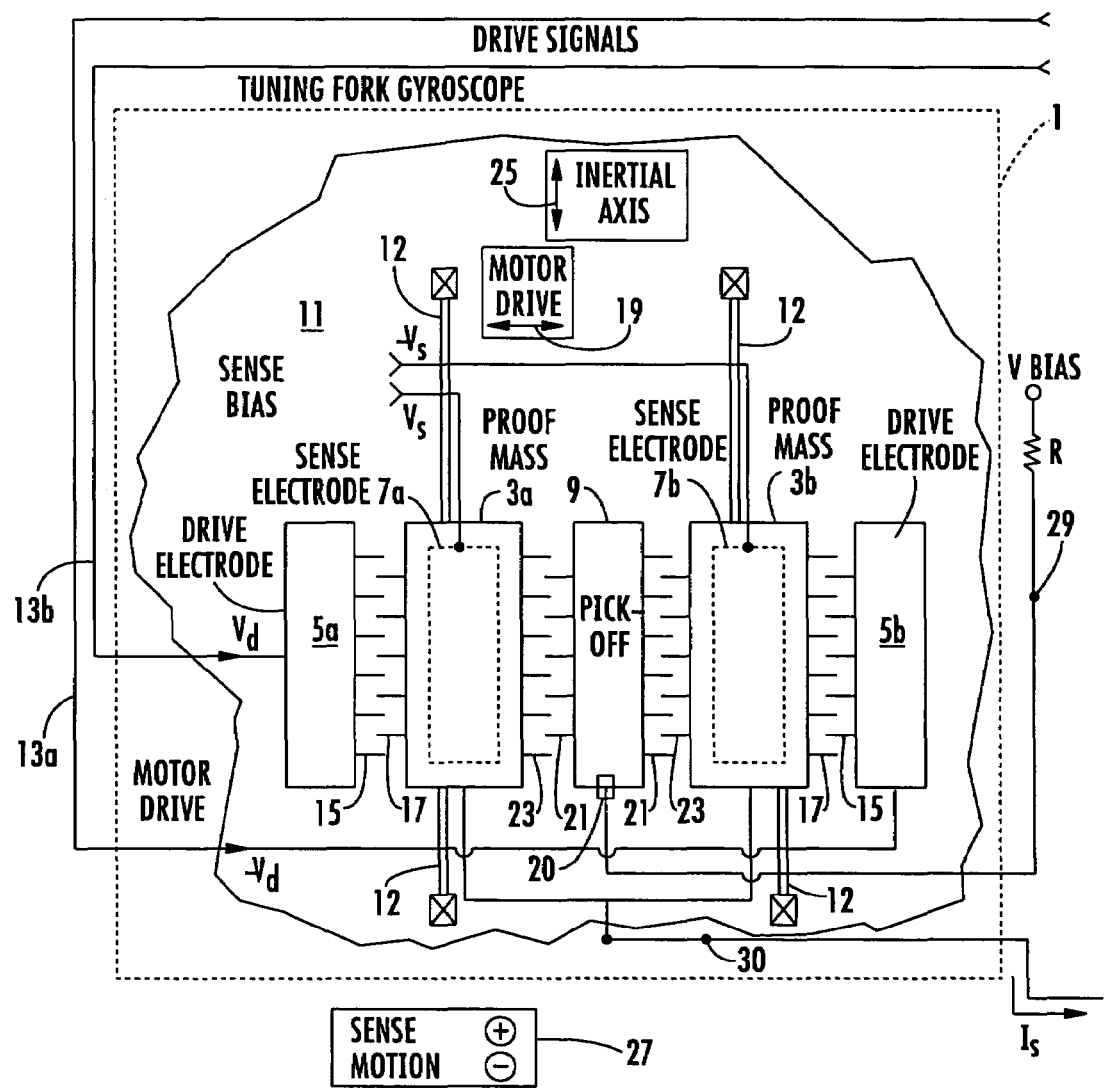
FIG. 1 is a schematic top view of a typical prior art tuning fork gyroscope.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

As delineated in the background section above, typical prior art tuning fork gyroscope 1 includes a pair of proof masses 3a and 3b suspended above substrate 11 by support flexure structure 12, a pair of drive electrode structures 5a and 5b, and pick-off or in-plane sense electrode structure 9. Out-of-plane sense plate electrodes 7a and 7b are deposited on substrate 11 beneath proof masses 3a and 3b.

Drive signals 13a and 13b are provided to drive electrodes 5a and 5b, respectively, as shown. The drive electrodes 5a and 5b include a plurality of comb-like geometry electrode fingers 15 extending therefrom and toward an adjacent one of proof masses 3a and 3b. Similarly, proof masses 3a and 3b have comb-like electrode fingers 17 extending toward the adjacent one of the fixed drive electrodes 5a and 5b and interleaved with the electrode fingers 15 of the corresponding drive electrode. Electrostatic coupling of the drive signals 13a and 13b to the corresponding proof masses 3a and 3b imparts vibration to the proof masses in the plane of the tuning fork gyroscope in the direction indicated by arrow 19 labeled "motor drive." The outer and inner combs may also have several comb segments. A DC voltage $V_S$ (labeled "sense bias") is applied to the out-of-plane sense plate electrodes 7a and 7b for establishing a potential difference so that a change in the capacitance between electrodes 7a and 7b and the proof masses 3a and 3b results in a charge on the proof masses 3a and 3b. At resonance, the proof mass displacement lags drive force by 90 degrees.

In-plane sense or pick-off electrode structure 9 is disposed between proof masses 3a and 3b and also has comb-like electrode fingers 21 extending from the opposite sides thereof toward the adjacent one of the proof masses. Each of the proof masses has similar electrode fingers 23 extending toward electrode structure 9 and interleaved with the electrode fingers 21 thereof.

In response to an inertial input, and specifically to a rotational rate about an input axis coplanar to the plane of vibration (labeled inertial axis 25), the proof masses 3a and 3b deflect out of the plane of vibration, i.e., about an axis orthogonal to an input axis 27 (labeled "sense motion"). Such an out-of-plane deflection of proof masses 3a and 3b occurs at a frequency corresponding to the resonant frequency of the proof masses and with an amplitude corresponding to the input rotational rate. Thus, detection of the out-of-plane deflection of proof masses 3a and 3b provides a measure of the rotational rate. A bias signal $V_{bias}$ is coupled to in-plane pick-off electrode structure 9 at 20 through resistor R to enable detection of charge variations caused by displacement of proof masses 3a and 3b in the plane of vibration. The resistor R with an impedance is connected between $V_{bias}$ and the in-plane pick-off to permit the signal at the pick-off to reflect modulation effects from charge, capacitance, and voltage values. An output 30 (measured in volts) from the in-plane pick-off is thus indicative of the out-of-plane deflection of the tuning fork gyroscope. $V_{bias}$ is typically a DC signal. See U.S. Pat. Nos. 5,747,961 and 5,481,914 incorporated herein by this reference.

As explained in the background section above, the limited extent of sense electrodes 7a and 7b on substrate 11 beneath proof masses 3a and 3b in this configuration result in exposed substrate (glass) material beneath significant portions of proof masses 3a and 3b. When a DC bias voltage is applied to sense plate electrodes 7a and 7b and a DC bias voltage is also applied to drive electrodes 5a and 5b, ultimately the glass substrate assumes a steady state voltage but that can take hours resulting in a scale factor transient of 10-15%.

Because of the high electrical resistivity of the glass substrate and its low dielectric constant, points on the glass are effectively linked to the applied DC voltages by long time constant electrical RC (resistance-capacitance) networks. These quasistatic voltages operate on the proof mass in manners similar to the DC voltages applied to the sense plates and motor combs. The glass voltage can inject current into the inner motor (motor sense) combs resulting in the generation of erroneous drive position signals. With closed loop operation, the drive amplitude depends on the slowly varying glass voltage. Changing drive amplitude and, hence, velocity changes the scale factor. With sense motion, the glass voltages inject current into the proof masses. This current is sensed by the sense axis electronics. Effectively, the sense plate bias has a variation; that is, scale factor varies with the glass voltage. These voltages electrostatically force the proof masses directly. This appears as erroneous torques, which result in bias variations, or changes in spring stiffnesses, which result in scale factor errors.

Figure 2:
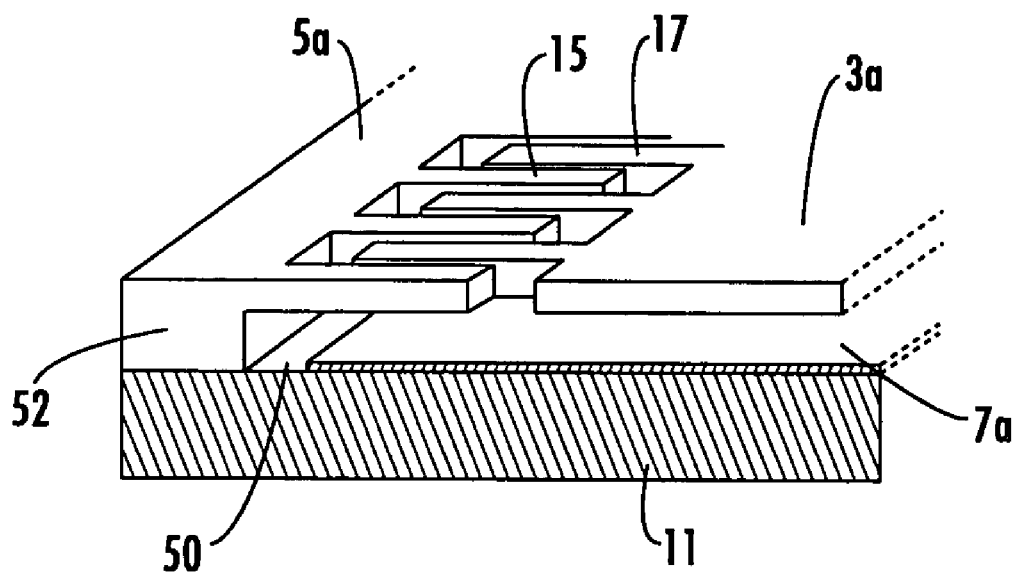
FIG. 2 is a schematic three-dimensional view of a portion of a tuning fork gyroscope with an extended sense plate in accordance with the prior art.

By extending the sense plate 7a as shown in FIG. 2, the amount of exposed glass at 50 beneath proof mass 3a was reduced to approximately 10 µm. This reduced the scale factor transient to approximately 1%. Certain military and commercial applications, however, require an even greater reduction in the scale factor errors but there are manufacturing limitations regarding how close sense plate electrode 7a can be deposited to anchor portion 52 of drive electrode 5a on substrate 11. Note that sense plate 7a does not extend completely under the extent of electrode fingers 17 or 15.

Figure 3:
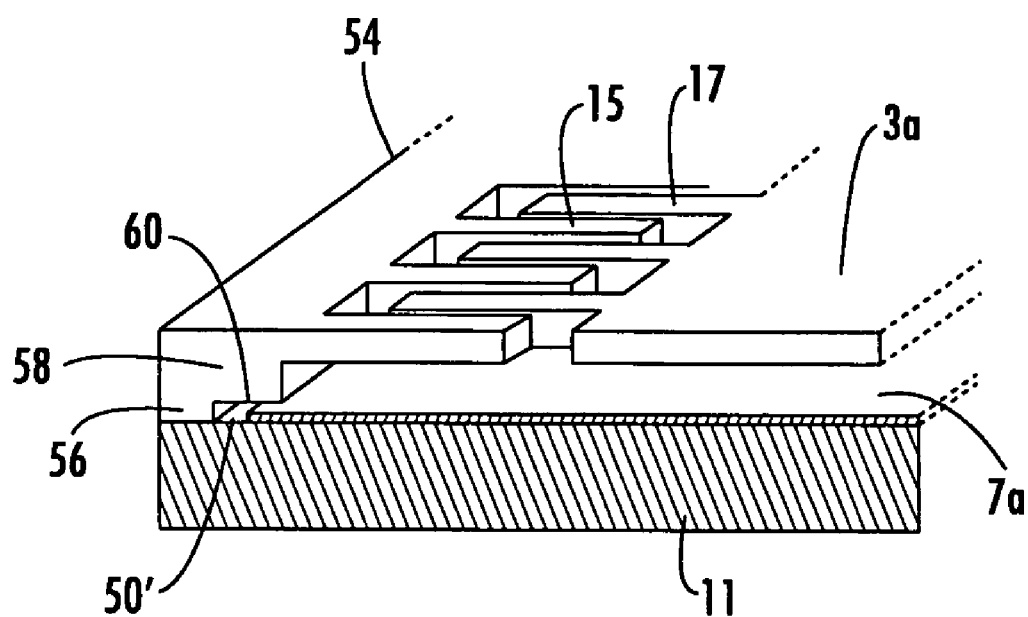
FIG. 3 is a schematic three-dimensional partial view of a portion of a tuning fork gyroscope in accordance with the subject invention.

In accordance with the subject invention, drive electrode 54, FIG. 3 includes smaller area anchor portion 56 on substrate 11 supporting larger area shoulder portion 58 from which electrode fingers 15 extend defining an undercut region 60 in drive electrode 54. Sense plate electrode 7a now extends into undercut region 60 and thus extends completely under the full extent of electrode fingers 17 of proof mass 3a minimizing the amount of exposed glass 50' beneath any portion of the proof mass 3a. By constructing both drive electrodes 5a and 5b and pick-off electrode structure 9, FIG. 1 in this manner, scale factor transients as low as 0.01-0.1% can be realized because the proof mass is shielded from the changing potential of the glass.

Thus, a typical MEMS tuning fork gyroscope in accordance with this invention includes substrate 11, FIG. 3 and at least one proof mass 3a supported above substrate 11. At least one electrode structure (drive electrode 54 and/or a pick-off or sense electrode as shown at 9 in FIG. 1) is supported above the substrate 11 adjacent proof mass 3a. Typically, but not necessarily, proof mass 3a and the electrode structure(s) include interleaved electrode fingers 17 and 15, respectively. Sense plate or shield electrode 7a is on substrate 11 beneath proof mass 3a and extends completely under the full extent of the electrode fingers 17 and the other structural components of proof mass 3a. As shown, electrode structure 54 is supported above substrate 11 by anchor portion 56 connected to shoulder portion 58 from which the electrode fingers 15 of the electrode structure extend. Anchor portion 56 is smaller in area than structural portion 58 defining undercut 60. Now electrode 7a can extend into the undercut region 60 to provide more complete shielding for proof mass 3a.

Typically, substrate 11 is made of glass (e.g., pyrex) and proof mass 3a and the other in-plane electrode structures are made of silicon. Electrode 7a is typically made of a metal such as gold deposited on substrate 11.

For a typical tuning fork gyroscope, there are two proof masses, a drive electrode on each side of each proof mass, and a sense electrode beneath each proof mass as shown in FIG. 1. Each drive electrode and the sense or pick-off electrode between the two proof masses include the undercut region 60 as shown in FIG. 3. The pick-off electrode would include undercut regions on both sides thereof.

The subject design, however, is not limited to sensors in the form of gyroscopes. For other sensors, including but not limited to accelerometers, there will be at least one proof mass structure supported above a substrate and at least one electrode structure also supported above the substrate adjacent the proof mass. By forming the electrode structure to include a smaller area anchor portion extending upward from the substrate connected to a larger area shoulder portion supported above the substrate to define an undercut region in the electrode, the sense plate or shield electrode on the substrate can be extended beneath the undercut region of the electrode structure to reduce the scale factor transient since the sense plate electrode now extends completely under the proof mass structure. Electrode fingers in a comb geometry may or may not be used depending on the specific design.

Figure 4:
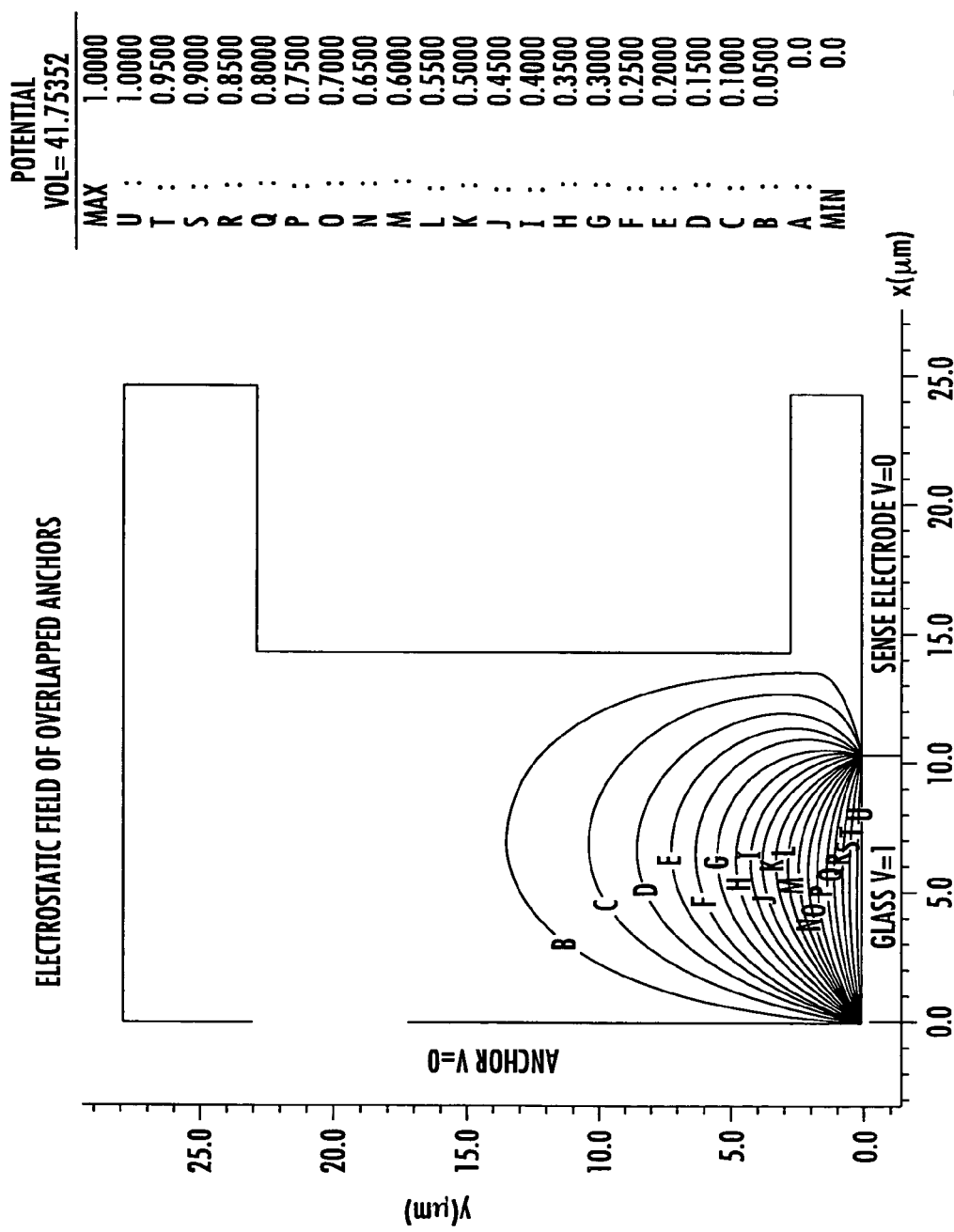
FIG. 4 is a graph showing the electric potential generated by the gyroscope design of FIG. 2.
Figure 6:
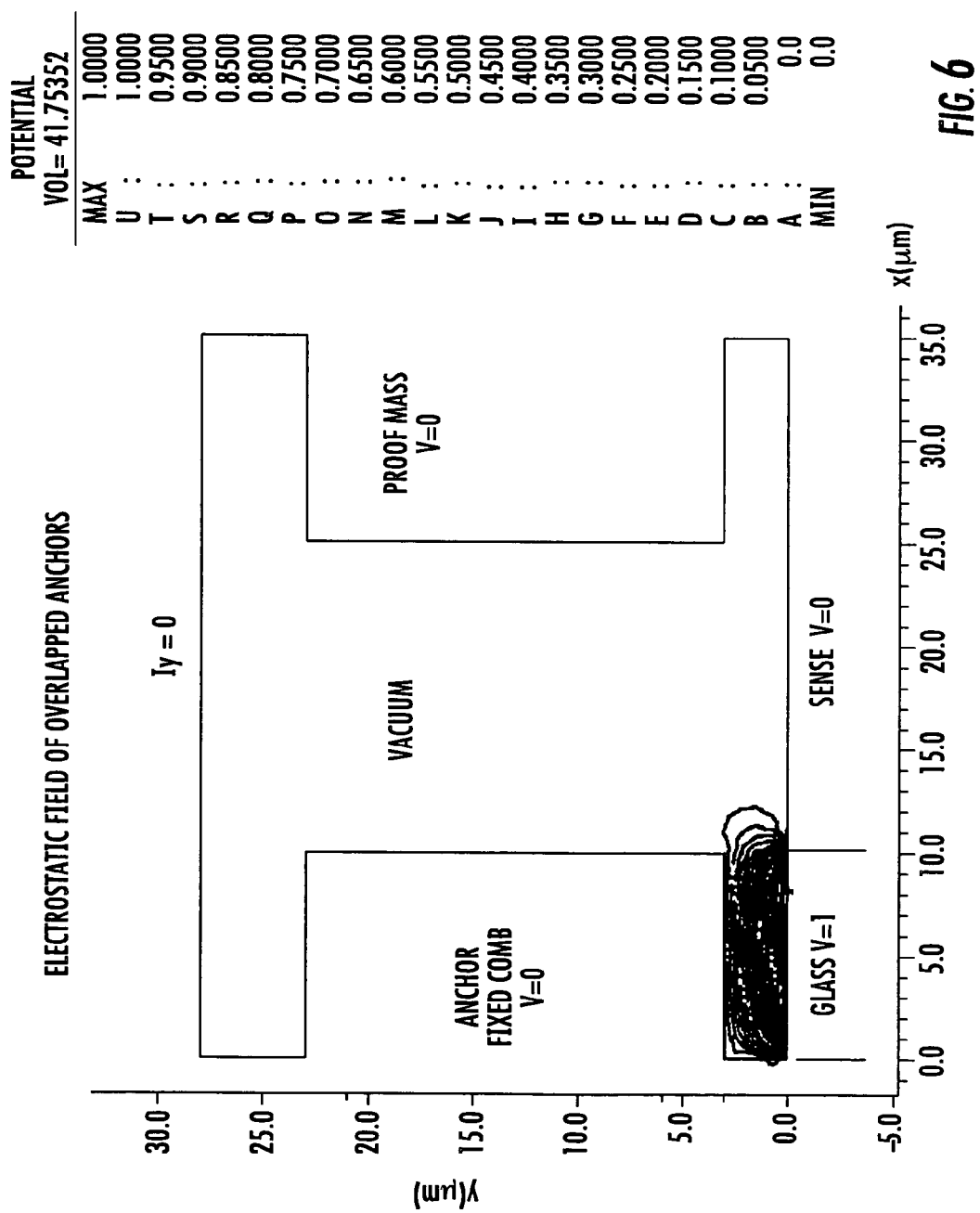
FIG. 6 is a graph showing the electric potential generated by the gyroscope design shown in FIG. 5 in accordance with the subject invention.

The benefits of such a design are shown when FIGS. 4 and 6 are compared. Good performance results when the electrostatic fields generated by the glass voltages is small near the moving masses. FIGS. 4 and 6 display equal potential lines (constant voltage) for a two-dimensional tuning fork gyroscope comb geometry. The field is calculated in a plane normal to the substrate through a proof mass comb finger. At a 10 µm drive amplitude, the proof mass moves to 15 µm from the fixed anchors as shown in the figures. In both figures, one volt is applied to the dielectric surface near the anchors. The anchors and the proof mass combs are at 0 volts, a valid assumption since superposition can be invoked. Note, in FIG. 4 that for the design of FIG. 2, the electric fields extend from the glass to the comb (electrode finger) tips.

Figure 5:
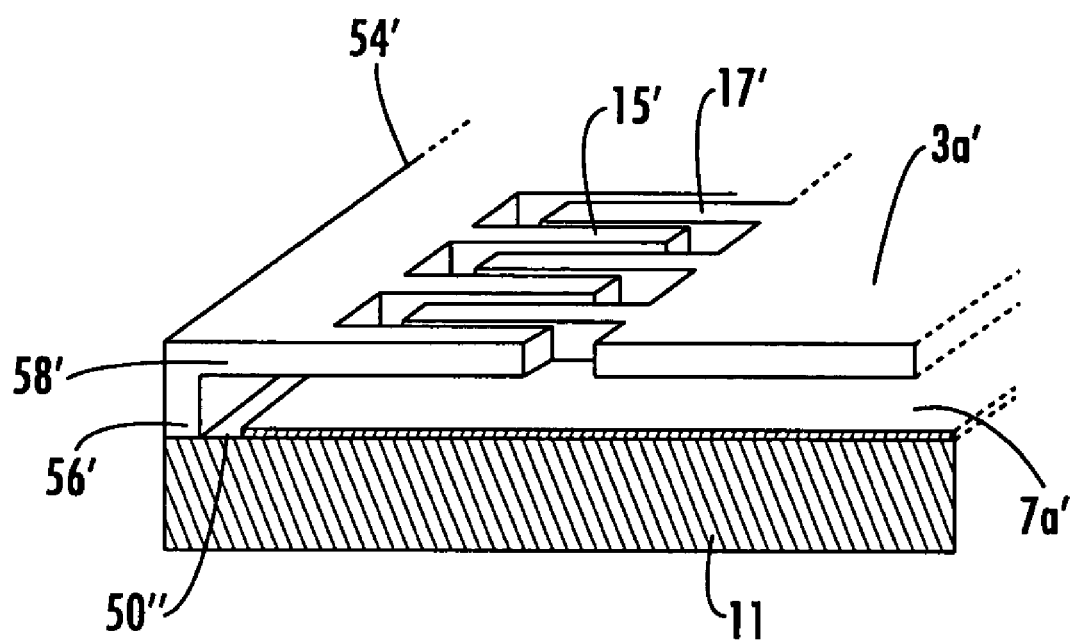

In accordance with another embodiment of the subject invention, drive electrode 54', FIG. 5 includes smaller area anchor portion 56' on substrate 11 supporting larger area shoulder portion 58' from which electrode fingers 15' extend. Electrode 7a' now extends completely under the full extent of electrode fingers 17' of proof mass 3a' minimizing the amount of exposed glass 50" beneath any portion of the proof mass 3a'. Sense plate 7a' also extends beneath the full extent of electrode fingers 15'. The proof mass is shielded from voltage transients in glass 50'. By constructing both drive electrodes 5a and 5b and pick-off electrode structure 9, FIG. 1 in this manner, the scale factor reaches 0.01-0.1% of its final valve almost instantly. With the undercut design represented in FIG. 5, the voltage is confined beneath the anchor and the electric fields do not extend to the proof mass as shown in FIG. 6.

The undercut 60 and extended sense or shield plate shown in FIG. 5 can be manufactured without substantially changing the dissolved wafer process used to construct a tuning fork gyroscope as disclosed in U.S. Pat. No. 5,492,596 also incorporated herein by this reference. The anchors are undercut as shown in FIG. 3 by modifying the mask used to define the depression cut into the silicon (or glass wafer in a modified dissolved wafer process). The modified sense plate electrode is formed by changing the mask used for metal deposition. The more complete shielding of the proof mass(es) by extending the sense plate electrode(s) in accordance with this invention improves instrument performance to levels required for many sensor applications including but not limited to tuning fork gyroscopes, silicon oscillating accelerometers, pressure sensors, and oscillators.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art and are within the following claims.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

What is claimed is:

1. A tuning fork gyroscope comprising:

a substrate;

at least one proof mass supported above the substrate;

at least one drive electrode supported above said substrate adjacent said proof mass by an anchor portion connected to a shoulder portion, wherein the anchor portion is smaller in area than the shoulder portion defining an undercut region in the drive electrode;

the proof mass and the drive electrode including interleaved electrode fingers; and a sense plate or shield electrode on the substrate beneath the proof mass and extending into the undercut region and completely under the extent of the electrode fingers of the proof mass and the electrode fingers of the drive electrode.

2. The tuning fork gyroscope of claim 1 in which the electrode fingers of the drive electrode extend from the shoulder portion.

3. The tuning fork gyroscope of claim 1 in which the substrate is made of glass and the proof mass and drive electrode are made of silicon.

4. The tuning fork gyroscope of claim 1 in which the sense plate or shield electrode is made of metal.

5. The tuning fork gyroscope of claim 1 in which there are two proof masses, a drive electrode on one side of each proof mass, and a sense plate or shield electrode beneath each proof mass.

6. The tuning fork gyroscope of claim 5 further including a pick-off electrode structure between the two proof masses.

7. A sensor comprising:
   a substrate;
   at least one proof mass supported above the substrate; and
   at least one electrode structure supported above said substrate adjacent said proof mass, the electrode structure including a smaller area anchor portion extending upward from the substrate connected to a larger area shoulder portion supported above the substrate defining an undercut region in the electrode, the proof mass and the electrode structure including interleaved electrode fingers; and
   a sense plate or shield electrode on the substrate beneath the proof mass extending into the undercut region of the electrode and completely under the electrode fingers of the proof mass and the electrode structure.

8. The sensor of claim 7 in which the substrate is made of glass and the proof mass and electrode structure are made of silicon.

9. The sensor of claim 7 in which the sense plate or shield electrode is made of metal.

10. The sensor of claim 7 in which there are two proof masses, a drive electrode structure on one side of each proof mass, and a sense plate or shield electrode beneath each proof mass.

11. The sensor of claim 10 further including a pick-off electrode structure located between the two proof masses.

* * * * *